United States Patent [19]

Lee

[11] 3,953,349

[45] Apr. 27, 1976

[54] OIL-SOLUBLE REACTION PRODUCTS OF (A) A HIGH MOLECULAR WEIGHT OLEFIN POLYMER, ACETONITRILE, AND CHLORINE WITH (B) AN AMINE, AND LUBRICANT COMPOSITIONS CONTAINING THE SAME

[75] Inventor: Richard J. Lee, Downers Grove, Ill.

[73] Assignee: Standard Oil Company, Chicago, Ill.

[22] Filed: Mar. 3, 1975

[21] Appl. No.: 554,597

Related U.S. Application Data

[63] Continuation-in-part of Ser. No. 426,722, Dec. 13, 1973, abandoned.

[52] U.S. Cl. .................................. 252/51; 252/50; 260/309.6; 526/22; 526/43; 526/50; 526/52; 526/217; 526/348; 526/351
[51] Int. Cl.² .......................................... C10M 1/32
[58] Field of Search .............................. 252/50, 51; 260/94.96 G, 94.96 B, 309.6

[56] References Cited
UNITED STATES PATENTS

| | | | |
|---|---|---|---|
| 2,505,247 | 4/1950 | Bottmingen | 260/309.6 |
| 3,210,371 | 10/1965 | Sawa et al. | 260/309.6 |
| 3,356,640 | 12/1967 | Meyer et al. | 260/94.9 GB |
| 3,360,506 | 12/1967 | DeBenneville et al. | 252/50 X |
| 3,450,646 | 6/1969 | Annand et al. | 260/309.6 X |
| 3,488,294 | 1/1970 | Annand et al. | 252/50 X |
| 3,493,545 | 2/1970 | Marsh | 260/94.9 GB X |
| 3,514,251 | 5/1970 | Annand et al. | 260/309.6 X |
| 3,631,058 | 12/1971 | Beck et al. | 260/309.6 X |
| 3,766,203 | 10/1973 | Sumida et al. | 260/309.6 |
| 3,821,244 | 6/1974 | Matier et al. | 260/309.6 |

*Primary Examiner*—Delbert E. Gantz
*Assistant Examiner*—Andrew H. Metz
*Attorney, Agent, or Firm*—Fred R. Ahlers; Arthur G. Gilkes; William T. McClain

[57] ABSTRACT

Novel addition agents for lubricants, are obtained by reacting a high molecular weight olefin polymer, having an average molecular weight of at least about 600, with acetonitrile and a halogen, for example chlorine, in the presence of a catalyst, such as iodine, for example, to form the intermediate (A) which is reacted with a primary or secondary amine.

13 Claims, No Drawings

OIL-SOLUBLE REACTION PRODUCTS OF (A) A HIGH MOLECULAR WEIGHT OLEFIN POLYMER, ACETONITRILE, AND CHLORINE WITH (B) AN AMINE, AND LUBRICANT COMPOSITIONS CONTAINING THE SAME

This application is a continuation-in-part of Ser. No. 426,722, and now abandoned.

BACKGROUND OF THE INVENTION

Lubricant deterioration in high speed engines causes the formation of lacquer, sludge, and carbon deposits on the interior surfaces of the engines which accelerates wear and reduces engine efficiency. To reduce the tendency for such deleterious products to deposit on the surfaces of the engine it is known to incorporate in the lubricating oil additives having dispersancy and/or detergency properties.

The continuing search for and the necessity of having available ashless dispersants and/or detergent additives for motor oils is well known. Since the development of the positive crankcase ventilation system (PVC) there is a greater demand for improved additives of such types.

Various products have been developed for the purpose of providing dispersant and/or detergent properties in lubricating oils. Neutral and over-based metallo-organic compounds such as alkaline earth salts of sulfonic acids, and hydrocarbon-$P_2S_5$ reaction products were among the first addition agents used for such purpose. Their in-service drawbacks include the formation of undesirable metal-ash thermal decomposition products. Other proposed addition agents were amine salts, amides, imides, and amides of polybutenyl-substituted polycarboxylic acids. Still other proposed additives were combinations of alkaline earth sulfonates and Mannich condensation products of alkyl substituted hydroxy-aromatic compounds, amines having at least one replaceable hydrogen on a nitrogen atom, and aldehydes; alkaline earth salts of such Mannich condensation products have also been proposed.

STATEMENT OF INVENTION

In accordance with the present invention the herein described products, useful as lubricant additives, are obtained by reacting intermediate (A) from the reaction of about 0.3 moles to about 2.5 moles of a high molecular weight olefin polymer, having an average molecular weight of at least about 600, with from about 0.5 moles to about 7.5 moles of acetonitrile, and from about 0.4 moles to about 2.0 moles of a halogen, such as bromine or chlorine in the presence of from about $7.8 \times 10^{-3}$ moles to about 0.02 moles of a catalyst, preferably iodine, suitably in the presence of a solvent or diluent, such as, for example chloroform, benzene, chlorobenzene and the like, at a temperature of from about 60° to about 160°F. and in the absence of light to form an intermediate (A) and, reacting the said intermediate (A) with a primary or secondary aliphatic amine, as hereinafter described, at a temperature of from about 200° to about 350°F. for a period of about 1– 6 hours, and recovering the resultant reaction product. Said amine being used in an amount to provide sufficient amine groups to replace the halogen atoms in said intermediate (A).

The high molecular weight olefin polymer reactant is preferably a polymer of a lower mono-olefin having an average molecular weight of at least about 600, preferably from about 1,000 to about 100,000, or more. The sources of the olefin polymer reactant include the polymers of 1-mono-olefins, such as ethylene, 1-butene, isobutene, as well as medial olefins such as 2-butene and the like. Particularly preferred are the polymers of propene and butenes, or mixtures thereof, having average molecular weights in the range of from about 600 to about 3,000.

The amine reactant employed is preferably a primary or secondary aliphatic amine which can be a $C_1$-$C_{10}$ alkyl or dialkyl amine, or polymethylene diamine of the general formula $H_2N(CH_2)_y NH_2$, wherein $y$ is an integer of about 3 to 10, or alkylene polyamines of the general formula

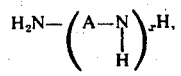

wherein A is a divalent alkylene radical of about 2 to about 6 carbon atoms and $x$ is an integer of from 1 to about 10. Illustrative of suitable amines are, methylamine, dibutylamine, cyclohexylamine, ethylene diamine, trimethylene diamine, hexamethylene diamine, diethylene triamine, triethylene tetramine, tetraethylene pentamine, tripropylene tetramine, and higher homologs of such amines.

The chemical composition of the reaction product of this invention cannot be characterized with preciseness by chemical structural formula. While it is believed that the reaction produces predominately certain polymer imidazolines, it is known that minor amounts of other end products may also be formed. In view of the complex nature of the resultant reaction products, the precise composition of such product cannot be defined by its chemical structure, but rather must be defined by its method of preparation.

Such product-by-process, although undefinable with respect to all of its components, does contain a substantial amount among the various molecular entities of hydrocarbon-substituted (from the olefin polymer reactant) imidazoline which forms from the following proposed mechanism indicated as occurring stepwise in four steps. The olefin polymer reactant is indicated as

since it is known to have a single terminal vinyl or vinylidene radical.

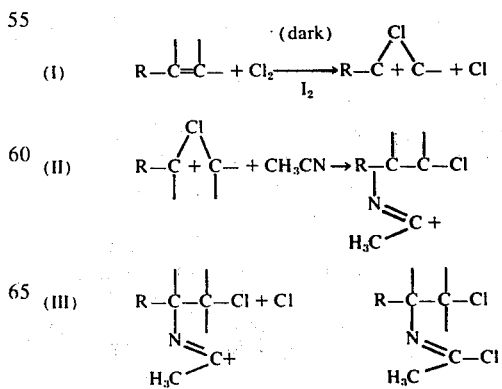

(IV)
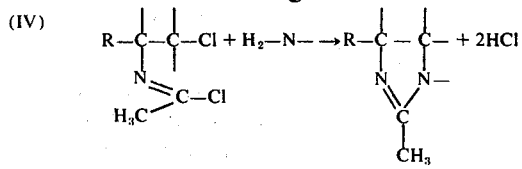

Supporting steps I–III are the publications by Cairn et al. in J.O.C. 17, 751 (1952) and later by Harsner et al. in Chem. Eng. News, 44, 44 (1966) who used bromine for the production of beta-bromo enamine ions.

The unsatisfied valence in the product of step (IV) can be satisfied by $C_1$–$C_{10}$ alkyl (R'), from the appropriate R=$C_1$–$C_{10}$ alkyl substituted primary amine, R'—$NH_2$; —$(CH_2)_y NH_2$ (wherein y is 1–10) from the appropriate polymethylene diamine of the foregoing formula; or —$(A—NH)_x H$ wherein A is the $C_2$–$C_6$ divalent alkylene radical and x is 1–10 as in the foregoing alkylene polyamine formula; two of such products of step IV can be joined by one —$(CH_2)_y$— radical from the polymethylene diamine, or two of such products can be joined by one —(A—NH)—$_{x-1}$A— radical from the alkylene polyamine.

However, two moles of secondary amines as well as the primary amines and one mole of alkylene polyamine having both primary and secondary amino groups can react with both of the chlorines and split out two moles of HCl. In such cases the final product is not a hydrocarbon substituted imidazolene but rather is a diamine compound whose basic structure is

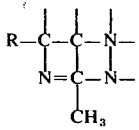

Specific diamines having such structures can be

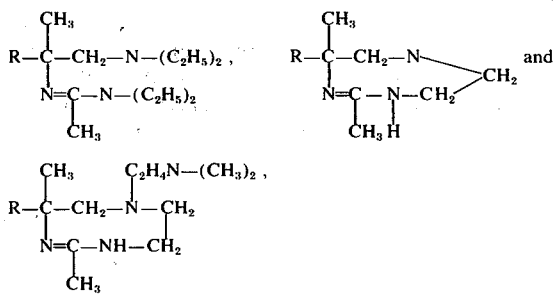

respectively, from diethylamine, ethylene diamine and -$N^3$- dimethyl-ethylene triamine and the olefin polymer is a butene polymer.

From the mole ratios of reactants given before for the practice of this invention and hereinafter illustrated it will be understood by those skilled in this art that the final product can contain a mixture of the variously possible substituted amine products which mixture cannot be defined by a single conventional structure but rather must be defined as a reaction product.

The reaction products of the herein described invention are useful and effective additives for oleaginous lubricant compositions to impart desirable properties thereto when used in amounts of from about 0.1 to about 10%. Suitable lubricating base oils are mineral oils, i.e., petroleum oils, synthetic lubricating oils, such as those obtained by the polymerization of hydrocarbons, and other well-known synthetic lubricating oils, and lubricating oils of vegetable and animal origin. Concentrates of suitable oil bases containing more than 10%, i.e., from about 10 to about 75%, or more, of the additive of the present invention, alone or in combination with other well-known additives, can be used for blending with lubricating oils in proportions desired for particular conditions or use, to give a finished product containing the effective amount of the additive of the present invention.

PREFERRED EMBODIMENT OF THE INVENTION

The following examples are illustrative of preferred embodiments of the present invention.

EXAMPLE I

Intermediate A

A sample of 1405 grams (0.5 mole) of a butene polymer having an average molecular weight of about 2,000, were dissolved in 950 ccs. of chlorobenzene, and to the solution were added 60 grams (1.46 moles) of acetonitrile, and 5 grams of iodine, as catalyst. The mixture was covered from light and cooled to 60°–70°F. Under vigorous stirring chlorine gas (0.75 mole) was introduced into the reaction mass at the rate of 0.08–0.10 liters per minute, through a dispersor, for a period of 3 hours. When the reaction was completed, the system was purged with nitrogen to remove all unreacted gases.

(B) Reaction of Amine with Intermediate (A)

A 0.4 mole portion of Intermediate A, above, is reacted with 0.4 mole of ethylene diamine dissolved in 100 ccs. of pyridine by heating the mixture to reflux temperature for 3 hours. Pyridine hydrochloride is removed by filtration, and the solvents are stripped from the filtrate by purging with nitrogen at a temperature up to 350°F. The recovered product was then diluted with a SAE 5W oil to obtain a 40% active product.

EXAMPLE II

A. 760 grams (0.38 mole) of a propene polymer having an average molecular weight of about 2,000, are dissolved in 500 ccs. of chlorobenzene, and to the resultant solution there is added 30 grams (0.73 mole) acetonitrile and 5 grams of iodine, as the catalyst. The mixture is covered from light and cooled to 60°–70°F. Under vigorous stirring chlorine gas (0.7 mole) is introduced into the reactor at the rate of 0.1–0.2 liters per minute, through a dispersor for a period of three hours. When the reaction is completed, the system is purged with nitrogen to remove unreacted gases.

B. To 0.2 mole of the intermediate A III there was added 0.2 mole of tetraethylenepentamine in pyridine and the mixture is heated at reflux temperature for three hours. The reaction product is filtered, and the filtrate purged with nitrogen at 300°F. to remove solvents. The purged product is diluted with SAE 5W oil to obtain a 50% active product.

EXAMPLE III

The preparation of Intermediate A of Example II is repeated to obtain 0.5 mole of Intermediate A which is reacted with 0.5 mole of n-butylamine under the reaction conditions of Part (B) of Example II. The pyridine hydrochloride and solvents are removed as before. The recovered product is diluted with SAE 5W oil to give a product of 40% activity.

EXAMPLE IV

A. 600 grams of a butene polymer, having an average molecular weight of about 2,000 are dissolved in 500 ccs. of chloroform, and to the solution is added 40 grams of acetonitrile, and 4 grams of iodine, as catalyst. The mixture was covered from light and cooled to 60°–70°F. Under vigorous stirring chlorine gas (0.4 moles) is passed into the reaction mass at the rate of 0.1–0.2 liters per minute for a period of 3 hours. The mole ratio of polymer:acetonitrile:chlorine was 1:3.3:1.3, respectively. When the reaction was completed the system was purged with nitrogen to remove unreacted gases.

B. The Intermediate product from Part (A)IV, above, is treated with 18 grams (0.15 moles) hexamethylene diamine, and the mixture heated at reflux temperature for 3 hours. The reaction mass is then filtered, and the filtrate purged at a temperature up to 300°F. to remove solvent. The purged reaction product is diluted with 200 grams of a SAE 5W oil to give a product of 48% activity.

EXAMPLE V

The reaction of Example IV (A) is repeated to obtain 0.3 mole of Intermediate II IA. Said intermediate is combined with 0.15 mole of triethyletetramine dissolved in pyridine and heated to reflux temperature for 3 hours. Thereafter pyridine hydrochloride and solvents are removed as before described. The recovered product is dissolved in SAE 5W oil to a concentration of 45 weight percent.

The effectiveness of the hereindescribed reaction products as lubricant additives is demonstrated by the data in Table I, below, in which data with respect of the so-called Spot Dispersancy Test, described below, and the so-called Panel Coker Test, which has a designation of MIL 7808, known in the industry. In the so-called Spot Dispersancy Test, a measured amount of the additive to be tested is mixed with a measured volume of crankcase lubricant oil formulation which has been used in a Lincoln Sequence V Engine Test, for 394 hours (twice the time of the standard test time). This composition is heated and stirred at 300°F. for 16 hours, and an aliquot is transferred to blotting paper. A control is made at the same time by heating and stirring at 300°F. for 16 hours a second oil sample from the 394 Lincoln Sequence V Engine Test, and depositing an aliquot on blotting paper. The deposits on the blotting papers are measured to obtain the average diameter of the outer oil ring (Do), and the average diameter of the inner sludge ring (D a). The ratio of Da/Do is an indication of the detergent/dispersant property of the additive.

In these tests the lubricating oil composition Sample B, was formulated by adding 2% of the reaction product of Example II, Part (B), above, to an oil formulation having the designation MS MIL B plus 1% of calcium alkyl benzene sulfonate and 1% calcium alkyl phenate.

TABLE I

| Sample | Spot Detergency Test[a] | Panel Coker Test[b] |
|---|---|---|
| A (Control) | 46 | N.D.* |

TABLE I-continued

| Sample | Spot Detergency Test[a] | Panel Coker Test[b] |
|---|---|---|
| B | 73.5 | 6 |

[a]Perfect 100
[b]Perfect 10
*Not determined

Percentages given herein and in the appended claims are weight percentages unless otherwise stated.

Although the present invention has been described with reference to certain specific preferred embodiments thereof, the invention is not limited thereto, but includes within its scope such modifications and variations as come within the scope and spirit of the appended claims.

I claim:

1. The oil-soluble product prepared by the process comprising, preparing intermediate A by reacting from about 0.3 moles to about 2.5 moles of a high molecular weight olefin polymer having an average molecular weight of at least about 600, with from about 0.5 moles to about 7.5 moles of acetonitrile and from about 0.4 moles to about 2.0 moles of chlorine or bromine in the presence of catalytic amount of iodine in the absence of light oil at a temperature of from about 60° to about 160°F. and thereafter reacting intermediate A with a primary or secondary aliphatic hydrocarbyl amine at a temperature of from about 200° to about 350°F. for about 1–6 hours, said amine being used in an amount to provide sufficient amine groups to replace the said halogen atoms in said intermediate A.

2. The oil-soluble product prepared by the process of claim 1, wherein the olefin polymer is polybutene.

3. The oil-soluble product prepared by the process of claim 1, wherein the olefin is polypropene.

4. The oil-soluble product prepared by the process of claim 1, wherein the amine is a primary or secondary $C_1$–$C_{10}$ alkyl amine.

5. The oil-soluble product prepared by the process of claim 1, wherein the aliphatic amine is selected from the group consisting of a polyamine of the general formula $H_2N(CH_2)_yNH_2$, wherein $y$ is an integer of from about 3 to about 10, and an alkylene polyamine of the general formula

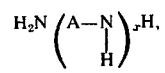

wherein A is a divalent alkylene radical from about 2 to about 6 carbon atoms and $x$ is an integer of from about 1 to about 10.

6. The oil-soluble product prepared by the process of claim 5, wherein the amine is ethylene diamine.

7. The oil-soluble product prepared by the process of claim 5, wherein the amine is hexamethylene diamine.

8. The oil-soluble product prepared by the process of claim 2 wherein the amine is n-butylamine.

9. A lubricant composition comprising a major amount of a normally liquid oleaginous lubricant, and from about 0.1 to about 10% of the oil-soluble product defined in claim 1.

10. A lubricant composition comprising a major amount of a normally liquid oleaginous lubricant, and from about 0.1 to about 10% of the oil-soluble product defined in claim 5.

11. A lubricant composition comprising a major amount of a normally liquid oleaginous lubricant, and from about 0.1 to about 10% of the oil-soluble product defined in claim 6.

12. A lubricant composition comprising a major amount of a normally liquid oleaginous lubricant, and from about 0.1 to about 10% of the oil-soluble product defined in claim 7.

13. A lubricant composition comprising a major amount of a normally liquid oleaginous lubricant, and from about 0.1 to about 10% of the oil-soluble product defined in claim 8.

* * * * *

UNITED STATES PATENT OFFICE
CERTIFICATE OF CORRECTION

Patent No. 3,953,349      Dated April 27, 1976

Inventor(s) Richard J. Lee

It is certified that error appears in the above-identified patent and that said Letters Patent are hereby corrected as shown below:

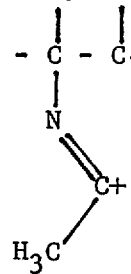

Column 2, equation I, delete "R - C + C - + Cl" and insert -- R - C———C- + Cl -- equation II, delete "R - C + C -" and insert -- R - C———C - --;

in equations II and III, delete each occurrence of "R - C——C - Cl" and insert for each -- R - C - C——Cl --;

and in line 65 of equation III following "+" delete "Cl" and insert -- C̄l --.

Signed and Sealed this

Thirty-first Day of August 1976

[SEAL]

Attest:

RUTH C. MASON  
*Attesting Officer*

C. MARSHALL DANN  
*Commissioner of Patents and Trademarks*